United States Patent [19]

Cassaday et al.

[11] Patent Number: 4,669,756
[45] Date of Patent: Jun. 2, 1987

[54] ZERO DEAD VOLUME CONNECTOR

[75] Inventors: Michael M. Cassaday, Valhalla; Leon Castellani, Bronx; Stephen Saros, Wantagh, all of N.Y.

[73] Assignee: Technicon Instruments Corporation, Tarrytown, N.Y.

[21] Appl. No.: 735,528

[22] Filed: May 20, 1985

[51] Int. Cl.$^4$ .............................................. F16L 27/12
[52] U.S. Cl. ..................................... 285/24; 285/369; 285/354; 285/423; 55/386
[58] Field of Search ................. 285/354, 423, 177, 24, 285/375, 348, 369, DIG. 12; 55/386

[56] References Cited

U.S. PATENT DOCUMENTS

| | | | |
|---|---|---|---|
| Re. 31,974 | 8/1985 | Brownlee | 55/386 |
| 148,285 | 3/1874 | Cornelius | 285/375 |
| 597,733 | 1/1898 | Myers | 285/369 |
| 906,099 | 12/1908 | Burgess | 285/369 |
| 1,228,323 | 5/1917 | Hudgins | 285/369 |
| 3,819,212 | 6/1974 | St. John et al. | 285/369 |
| 3,855,130 | 12/1974 | Randau et al. | 55/386 |
| 3,880,452 | 4/1975 | Fields | 285/177 |
| 3,889,712 | 6/1975 | Fields | 137/625.47 |
| 4,026,803 | 5/1977 | Abrahams | 55/386 |
| 4,083,702 | 4/1978 | Hartigan et al. | 55/386 |
| 4,165,893 | 8/1979 | Fields | 285/158 |
| 4,253,846 | 3/1981 | Smythe | 23/230 |
| 4,291,903 | 9/1981 | Fields | 285/354 |
| 4,313,331 | 2/1982 | Mode | 72/368 |
| 4,313,828 | 2/1983 | Brownlee | 55/386 |
| 4,451,363 | 5/1984 | Brownlee et al. | 55/386 |
| 4,451,364 | 5/1984 | Higgins et al. | 285/177 |
| 4,529,230 | 7/1985 | Fatula, Jr. | 285/369 |

FOREIGN PATENT DOCUMENTS 2097694 11/1982 United Kingdom .................. 55/386
561134 2/1976 U.S.S.R. ................................. 55/386

OTHER PUBLICATIONS

General Value Catalog, "GV Miniature Fittings and Connectors for Instruments and Automation", 5 pages.
Swagelok Tube Fittings, Crawford Fitting Co. Catalog C-578, pp. 1-32, 1978.
"Omnifit" Catalog, Flangeless Miniature Fluid Fittings, 18 pages.
"Liquid Chromatography Fittings", Catalog 16, Upchurch Scientific, pp. 1-32.
*Hydraulics and Pneumatics*, pp. 53-57, Feb. 1980, E. Jacobs.
Lee Company Catalog, "Instac Inert System of Tubing and Components", 13 pages.
Sno—Trik Catalog, "Fittings for Heavy Wall Tubing", 8 pages.

*Primary Examiner*—Cornelius J. Husar
*Assistant Examiner*—Eric K. Nicholson
*Attorney, Agent, or Firm*—Edward H. Gorman, Jr.; Jeffery M. Greenman; James J. Romano, Jr.

[57] ABSTRACT

New and improved connector is provided for the zero dead volume connection of separate, like diameter flexible tubing lengths by direct tubing length end abutment and connection under controlled conditions. The connector is particularly adapted for use with tubing lengths of fluorocarbon or like materials in contemporary biomedical sample liquid analysis systems which utilize an immiscible isolation liquid or "oil" to minimize sample liquid carryover and maximize the accuracy of sample liquid analysis results.

13 Claims, 3 Drawing Figures

ZERO DEAD VOLUME CONNECTOR

BACKGROUND OF THE INVENTION

1. Field of The Invention.

This invention relates to a new and improved, zero dead volume connector for effectively connecting separate tubing lengths, and which is particularly adapted for use in contemporary biomedical sample liquid analysis systems.

2. Description of the prior art.

Although a very wide variety of connectors for connecting separate tubing lengths are, of course, known in the prior art, none are known to applicants which provide the significant advantages of zero dead volume as a result of direct tubing length-tubing length connection, relative simplicity of construction, manner of connector component fabrication, and manner of connector assembly, relatively low cost, re-usability, and particular adaptability for use with chemically inert fluorocarbon or like flexible tubing materials of contemproary biomedical sample liquid analysis systems, as are respectively provided by the connector of our invention.

More specifically, although the flangeless tubing connector as marketed under the Trademark "OMNIFIT" by Omnifit, Ltd. of Atlantic Beach, N.Y., does, at least initially provide a zero dead volume tubing length connection, the same is expensive to manufacture, limited in re-usability, somewhat difficult to manufacture, and is prone, after not unreasonable periods of operational use, to partial internal disassembly and attendant creation of a not insignificant dead volume. Too, since this connector is specifically designed for high pressure applications, it will be clear to those skilled in this art that the same is, in reality, over-designed for use in contemporary biomedical sample liquid analysis systems which generally do not present a particularly high pressure environment.

The connector of U.S. Pat. No. 3,880,452 is a variable bore device for use in connecting tubing lengths of different diameters; and, as such, cannot provide a tubing length-tubing length connection. In addition, this connector is somewhat complex and expensive and, almost of necessity, includes a relatively large dead volume.

The valve of U.S. Pat. No. 3,889,712 does include valved connecting bores to which separate tubing lengths can be operatively connected; but this, of necessity, renders impossible direct tubing length-tubing length connection, and again dictates relatively large dead volumes.

The Chromatographic and KN Tube Fittings, or connectors as marketed under the Trademark "Swagelok" by Crawford Fitting Company of Solon, Ohio do provide relatively low dead volume tubing length connections. These connectors do not, however, provide a direct tubing length-tubing length connection, thus introducing a "foreign" central body member to the fluid flow path through the connector; are somewhat difficult and expensive to manufacture and assemble; and are not re-usable. In addition the Chromatographic fitting is designed primarily for relatively high pressure applications with metallic tubing lengths, and is thus clearly over-designed for use with fluorocarbon or like tubing length materials.

Other relevant connectors or fittings include those described in Catalog 16 of Upwich Scientific, Sunnyvale, Calif. entitled "Liquid Chromatographic Fittings; those described in article entitled "What's available in pneumatic instant fittings" by E. Jacobs at pages 53 through 57 of Feb., 1980 issue of HYDRAULICS & PNEUMATICS; the connectors as marketed under the Trademark "INSTAC" by The Lee Company of Westbook, Conn. and described in Lee Company catalog entitled "INSTAC Inert System of Tubing and Components;" the high pressure connectors marketed by Sno-Trik Company of Solon, Ohio under the Trademark "Sno-Trik" and described in Sno-Trik's catalog entitled "Fittings For Heavy Wall Tubing;" and the fittings and connectors as marketed under the Trademark "GV" by General Valve Corporation of East Hanover, N.J. and described in General Valve's catalog entitled "GV Miniature Fittings and Connectors For Instruments And Automation." None of these other fittings and connectors will, however, be seen to be configured or operable in the manner of the zero dead volume connector of our invention, or to provide the significant advantages provided thereby as are summarized hereinabove.

U.S. Pat. No. 4,313,331 discloses a connector with a complex and expensive quick tubing release collar and highly machined body part, and is rendered generally irrelevant by the dead volume and hidden unswept spaces provided thereby.

SUMMARY OF THE INVENTION

This invention provides a new and improved connector for the zero dead volume connection of separate, like diameter flexible tubing lengths by direct tubing length end abutment and connection. The connector comprises retaining means taking the form of spaced ferrules for gripping the tubing lengths short of the tubing length ends to leave tubing length end portions projecting from the ferrules, and tubing length end portions guiding and centering means taking the form of a generally tubular pilot bushing disposed between the ferrules and operable to receive the tubing length end portions to guide and center the same into aligned abutment and connection within the bushing. Clearances are provided between the tubing length end portions and the pilot bushing bore to provide for freedom of movement therebetween. A generally tubular body member, which may be readily assembled and disassembled, operates to contain and align the ferrules and pilot bushing with clearances to provide for freedom of movement therebetween; and biasing means taking the form of a coil spring are also contained within the body member to bias the ferrules together and thus bias the respective tubing length ends into firm abutment and fluid-tight connection. The connector is particularly adapted for use with tubing lengths of fluorocarbon or like materials in contemporary biomedical sample liquid analysis systems which utilize an immiscible isolation liquid or "oil" to minimize sample liquid carryover and thus maximize sample liquid analysis results accuracy.

OBJECTS OF THE INVENTION

It is, accordingly, an object of our invention to provide a new and improved, zero dead volume connector for effectively connecting separate tubing lengths.

It is another object of our invention to provide a connector as above which is of relatively simple and inexpensive configuration, and manners of fabrication and assembly.

It is another object of our invention to provide a connector as above which makes use of direct tubing length end-tubing length end abutment to effect the desired connection.

It is another object of our invention to provide a connector as above which requires only the use of readily available materials of proven dependability in the fabrication thereof.

It is another object of our invention to provide a connector as above which is readily re-usable.

It is another object of our invention to provide a connector as above which is particularly adapted for use with fluorocarbon or like tubing length materials which are currently in wide use in a wide variety of applications.

It is another object of our invention to provide a connector as above which is particularly adapted for use in contemporary biomedical sample liquid analysis systems which operate through use of an immiscible isolation liquid or "oil" to minimize sample liquid carry-over and thus maximize the accuracy of sample liquid analysis results.

It is another object of our invention to provide a connector as above which has substantially no abrupt diameter variation at the site of connection.

It is another object of our invention to provide a connector as above wherein no part of the connector body or other connector components are contacted by liquid flowing through the tubing associated with the connector.

It is a further object of our invention to provide a connector as above, wherein there is provided a tubing connection which remains intact and does not come apart throughout the operating pressure range of the tubing.

DESCRIPTION OF THE DRAWINGS

The above and other signicant objects and advantages of our invention are believed made clear by the following detailed description thereof taken in conjunction with the accompanying drawings wherein.

DETAILED DESCRIPTION OF THE INVENTION

Figure 1:
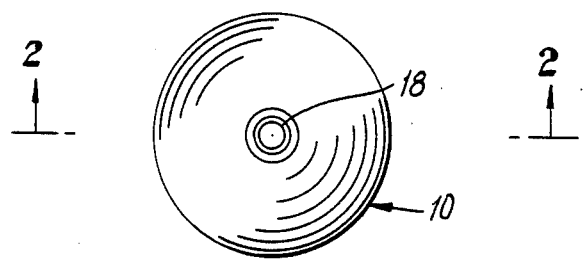
FIG. 1 is a top plan view of a new and improved, low dead volume connector representatively configured in accordance with the teachings of our invention.
Figure 2:
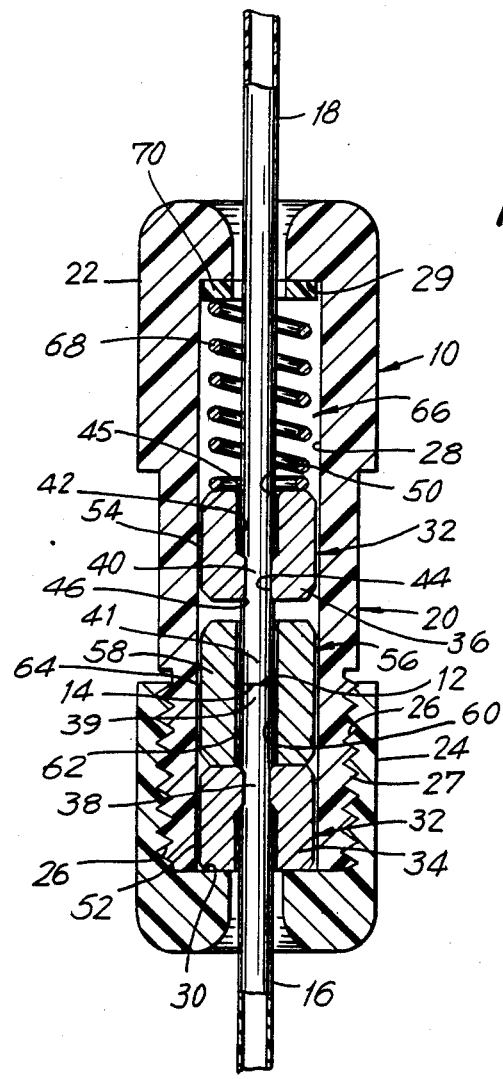
FIG. 2 is a cross-sectional view taken essentially along line 2—2 in FIG. 1.

Referring to FIGS. 1 and 2 of the drawings, a new and improved connector representatively configured and operable in accordance with the teachings of our invention is indicated generally at 10; and is operable, as described in detail hereinbelow, to particularly effectively connect by appropriately biased abutment therewithin the respective ends 12 and 14 of separate tubing lengths 16 and 18 of like diameter.

To this effect, connector 10 will be seen to comprise a generally tubular, two-piece body member 20 which is formed as shown by open ended, knurled generally tubular body member parts 22 and 24. As representatively depicted in FIG. 2, body member part 22 is externally threaded adjacent the lower end thereof as indicated at 26, and body member part 24 is complementally internally threaded as indicated at 27. Thus, the body member parts 22 and 24 may be readily attached together as shown to form the body member 20; and just as readily taken apart if desired to disassemble the body member 20. Of course, other and different means may be utilized to attach the body member parts 22 and 24.

Body member part 22 includes a stepped bore or internal space 28 closed in part as shown at the upper body member end as seen in FIG. 2 by internal wall 29, and closed in part as shown at the lower body member end by internal wall 30 of body member part 24.

Tubing length retaining means are indicated generally at 32, and take the form of generally tubular ferrules 34 and 36 of like configuration which are disposed in body member bore 28, and which are operable as shown to very firmly grip the respective tubing lengths 16 and 18 at tubing length portions 38 and 40 which are close to, but in each instance clearly short of, the respective tubing length ends 12 and 14; thus leaving in each instance what are essentially "free" tubing length end portions as indicated at 39 and 41 respectively extending as shown beyond the ferrules 34 and 36 inwardly of the connector 10.

Each of the ferrules 34 and 36, which are "mirror-imaged" in use as made clear by FIG. 2, includes a stepped bore as indicated at 42 for ferrule 36. Stepped bore 42 comprises a bore portion 44 of diameter which is somewhat less than the outer diameter of tubing length portion 40 and which, in conjunction with the sharp inner edge 46 of ferrule 36, very strongly resists forces tending to pull tubing length 18 out of the ferrule 36 in the upward direction as seen in FIG. 2, and very strongly resists in like manner forces tending to move ferrule downwardly as seen in FIG. 2 relative to tubing length 18. Stepped bore 42 further comprises a bore portion 45 which is of somewhat larger diameter than the outer diameter of tubing length 18 and which, in conjunction with bevelled ferrule bore edge 50, renders attachment of the ferrule 36 to the tubing length 18 very convenient as described in detail hereinbelow. Ferrule 34 which is of like configuration will be readily understood to interact with tubing length 16 in the same manner as that described for ferrule 36 vis-a-vis tubing length 18.

The outer diameter of ferrules 34 and 36 is somewhat less than the diameter of body member bore 28 to result in the provision of clearances therebetween as indicated at 52 and 54, respectively, in FIG. 2. Thus, ferrules 34 and 36 may be understood to be essentially "free-floating" within body member bore 28, albeit to a somewhat limited extent.

Further included in connector 10 are tubing end portion guide and centering means as indicated generally at 56, and which take the form of a generally tubular pilot bushing 58 having a bore 60 extending therethrough, and into which the respective tubing length end portions 39 and 41 extend as show for abutment and connection. The diameter of pilot bushing bore 60 is somewhat larger than the outer diameter of the tubing lengths 16 and 18 to provide a clearance therebetween as indicated at 62 for tubing length end portion 39; while the outer diameter of pilot bushing 58 is somewhat less than the diameter of body member bore 28 to provide a clearance therebetween as indicated at 64. Thus it will be clear that the respective tubing length end portions 39 and 41 are essentially "free-floating" within bushing bore 60, albeit to a somewhat limited extent; and that the pilot bushing 58 is in turn essentially "free-floating" within body member bore 28, albeit again to a somewhat limited extent.

Biasing means are indicated generally at 66 in FIG. 2, and take the form of coil spring 68 of appropriate force constant which is disposed as shown in body member bore 28 to surround tubing length 18, and which bears as shown against the upper end of ferrule 36 as seen in FIG. 2 to bias the same, and thus end portion 41 of tubing length 18, toward the end portion 39 of tubing length 16. Thus, tubing length end 14 is biased into firm abutment with tubing length end 16. An anti-rotation washer is indicated at 70 in FIG. 2 and is disposed as shown between coil spring 68 and internal wall 29 of body member part 22 to prevent rotation of the spring, and thus of ferrule 36 and tubing length end 14, relative to tubing length end 12. As a result, firm and relatively immovable, insofar as relative rotation is concerned, contact between tubing length ends 14 and 12 is assured; with the magnitude of the compressive forces acting thereon to maintain such contact being readily determinable in accordance with the force constant of coil spring 68 and the unconpressed length thereof relative to the distance between the relevant faces of anti-rotation washer 70 and ferrule 36.

For use, for example, in bio-medical diagnostic systems as discussed in greater detail hereinbelow wherein the tubing lengths 16 and 18 would be made from a suitably inert and flexible material such as Teflon or the like with demonstrated cold flow characteristics, ferrules 34 and 36, and pilot bushing 58, are preferably made from a readily available and readily machinable metal of suitable strength and corrosion-resistant characteristics, for example, free-machining stainless steel rod stock of appropriate diameter; while coil spring 68 and anti-rotation washer 70 are preferably made from any one of a wide variety of metals appropriate to the respective functions thereof. Body member parts 22 and 24 are preferably made from plastic and simply molded to the depicted configurations thereof.

For manufacture of the ferrules 34 and 36 and the pilot bushing 58, it will be clear to those skilled in this art that the same may readily and simply cut to the required lengths from free-machining stainless steel rod stock of appropriate diameter, and drilled to provide the stepped ferrule bore 42 and the pilot bushing bore 60; it being noted with regard to the latter that the stepped ferrule bore 42 may be formed in one drilling operation by an appropriately configured drill bit.

Operative insertion of the respective tubing lengths into the ferrules, for example tubing length 18 into ferrule 36 is readily and conveniently accomplished by the simple cutting of the tubing length end portion 41 on a bias through use, for example, of a common razor blade, and the simple insertion of the same into ferrule bore portion 45 and pushing the same through ferrule bore portion 44 to an extent sufficient to enable the grasping thereof by the fingers or, if required, by a simple grasping tool in the nature of a pair of pliers. The tubing length end portion 41 is then pulled through the ferrule bore 42 to an extent sufficient to provide a tubing length end portion 41 to extend from the ferrule 36 to an extent greater than that which will ultimately be required.

Figure 3:
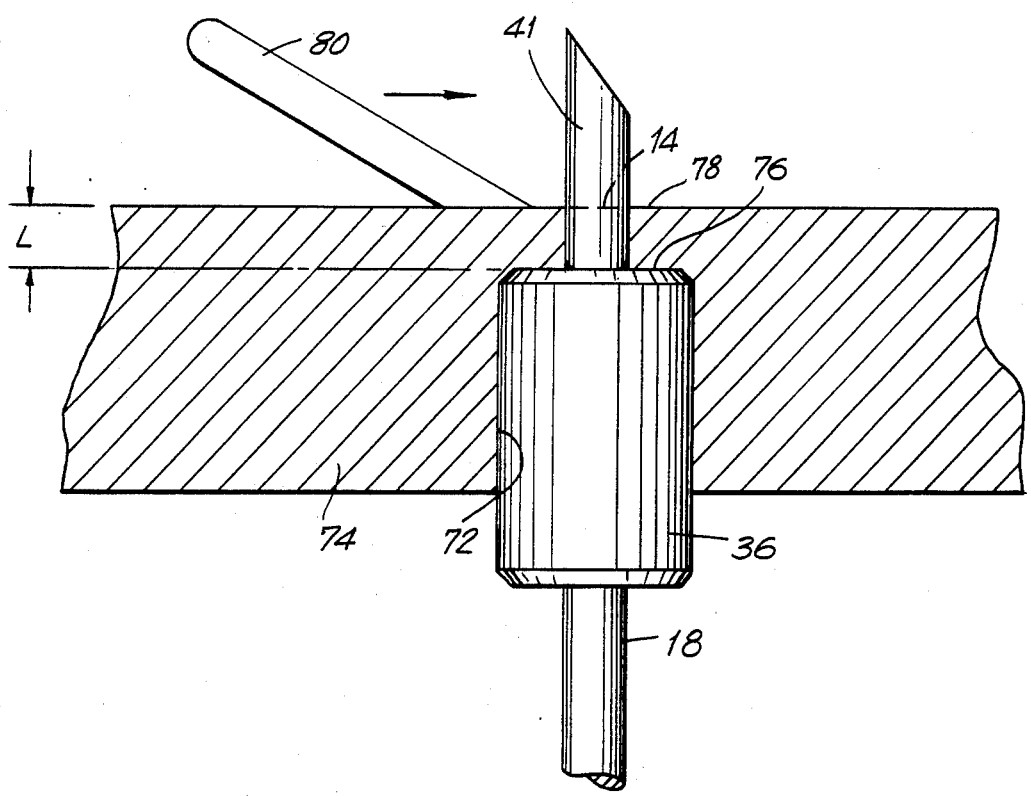
FIG. 3 is a cross sectional view taken generally longitudinally of a representative cutting fixture for use in the fabrication of the connector of our invention, and includes the depiction of connector components operatively disposed therein.

The ferrule-tubing length combination is then disposed as shown in FIG. 3 in the appropriately dimensioned stepped bore 72 of a cutting fixture 74 which is preferably made of a suitably hard metal such as steel. This results in the bias-cut end portion 41 of the tubing length 18 projecting upwardly as shown above the fixture 74; and it will be understood that the distance L of FIG. 3 between the face 76 of ferrule 36 and the face 78 of the cutting fixture is carefully predetermined to be exactly equal to the desired length of the tubing length end portion 41 for use in the connector 10. A razor blade or like very sharp cutting tool 80 is then brought into firm surface contact with the cutting fixture face 78 as shown In FIG. 3 and moved rapidly from left to right to cleanly and squarely cut the tubing length end portion 41 to precisely the desired length. Operative insertion of tubing length 16 in ferrule 34, and the clean and square cutting of the end portion 39 thereof to precisely the desired length, are accomplished in the same manner.

Although the stepped bore 42 in ferrule 36—and thus the like stepped bore in ferrule 34—includes a bore portion 44 of lesser diameter than that of tubing length 18, and will thus result in commensurate reduction, for example approximately 10%, of the outer and inner diameters of the tubing length portion 40 which extends therethrough, it will be clear that the dielike extruding action of the ferrule 36 upon the tubing length 18 as the same is pulled therethrough as described, taken in conjunction with the cold flow characteristics of the Teflon or like fluorocarbon tubing length material, will operate to insure that the tubing length diameter transitions in question to and from the tubing length portion 40 of reduced diameter are smooth and consistent, and will thus not adversely affect fluid flow therethrough.

With tubing lengths 16 and 18 operatively inserted as described in ferrules 34 and 36, and tubing length end portions 39 and 41 cleanly and squarely cut as described to precisely the desired lengths thereof, assembly of the connector 10 then becomes a simple matter of arranging the respective connector components in the manner depicted in FIG. 2, and then tightening the respective body member parts 22 and 24 together by relative rotation to the limit established by threads 26 and 27.

With the respective components of connector 10 fabricated, configured and assembled as described, it will be clear that a particularly effective connection of tubing length ends 12 and 14 is provided at the abutment thereof in that the connection is strictly tube-to-tube with virtually no dead volume or fluid flow boundary layer trippers or the like presented thereby. This is to say that virtually uninterrupted fluid flow from tubing length 16 to and through the like material of tubing length 18, or vice versa, is assured. This is of particularly significant advantage with regard to connector use in automated sample liquid analysis systems of the nature disclosed, for example, in U.S. Pat. No. 4,253,846 issued Mar. 3, 1981 to William J. Smythe, et al, and assigned to the assignee hereof, and in currently pending application for U.S. Pat. Ser. No. 441,181 of Steve Saros, et al filed Nov. 11, 1982 and assigned to the assignee hereof now U.S. Pat. No. 4,517,302, wherein an immiscible isolation liquid or "oil" which selectively "wets" the analysis system tubing length walls to the substantial exclusion of the sample liquids is utilized to form a flowing isolation liquid layer in contact with the internal tubing length walls to prevent sample liquid contact therewith and thus minimize sample liquid carryover and maximize the accuracy of the sample liquid analysis results. In such systems, it will be clear to those skilled in this art that any contact by the isolation liquid with a connector material which the former cannot selectively "wet" to the substantial exclusion of the flowing sample liquids, any unswept or dead connector volumes wherein the residue of a preceding sample liquid can accumulate to contaminate a succeeding sample liquid, and/or any disruption of the flowing isolation liquid layer as would enable a flowing sample liquid to contact the internal connector walls for retention thereon and contamination of a succeeding sample liquid, would respectively function to significantly degrade if not totally destroy the essential sample liquid carryover minimization function of the isolation liquid, and result in sample liquid analysis results of insufficient accuracy in accordance with contemporary standards. Of course, all of these occurrences are substantially prevented by the connector 10 of our invention.

Of additionally significant advantage with regard to the connector 10 are the facts that, with ferrules 34 and 36 and the pilot bushing 58 essentially "free-floating" within body member bore 28, albeit to limited extents, and thus ineffective to in any way restrain tubing length end abutment, and with pilot bushing 58 functioning to center the respective tubing length end portions 39 and 41 and prevent cocking or buckling thereof upon the application of positive or negative fluid pressure through the tubing lengths 16 and 18, the entire force of coil spring 68 is brought to bear and maintained on the abutment of tubing length ends 12 and 14 to provide and maintain a firm abutment and connection therebetween. This is particularly important in view of the fact that, despite the tubing length end cut precision provided by the cutting fixture 74 as described hereinabove with regard to FIG. 3 insofar as the provision of "clean" tubing length end cuts is concerned, microscopic examination of those end cuts will nonetheless reveal certain unavoidable irregularities. However, it will be clearly understood by those skilled in this art that the demonstrated cold flow characteristics of Teflon or like fluorocarbon tubing length materials, taken in conjunction with the freely applied and constantly maintained compressive forces of spring 68 at the abutment of tubing length ends 12 and 14 as described, will function within an acceptably short period of time following assembly of the connector 10 of our invention to effectively "heal" or close those microscopic irregularities and insure an acceptably fluid-tight connection at the tubing length end abutment.

With more specific regard to the clearances as at 54 in FIG. 2 between the ferrules 34 and 36 and the body member bore 28, and the clearance 64 between the pilot bushing 58 and the body member bore 28, it may be noted that a normal machine tolerance of 0.005 inches has proven satisfactory. With more specific regard to the clearance 62 between the tubing length end portions 39 and 41 and bore 60 in pilot bushing 58, it may be noted that, for use with tubing lengths having a nominal outer diameter of 0.060 inches and a nominal inner diameter of 0.040 inches, a line-on-line or light press fit of the tubing length end portions in the pilot bushing with a maximum clearance of 0.0005 has proven satisfactory; thus making clear that no discernible adverse effect upon the tubing length end portion alignment function of the pilot bushing 58 will result from clearance 62.

Although the maximum positive and negative fluid pressure capacity of the connector 10 of our invention will, of course, vary in accordance with the essential design parameters thereof, it has been determined that, with tubing length materials and inner and outer diameters as above, and with a spring 68 of appropriate force constant, the connector 10 will retain its structural and functional integrity to over 100 psi positive fluid pressure, and to at least one atmosphere of vacuum; thus making clear that, despite its essentially simple and inexpensive construction, the connector 10 is eminently well-suited for use in virtually all contemporary bio-medical systems and applications.

Although inexpensive, the connector 10 of our invention is nonetheless readily re-usable; it being clear that re-use would require only the simple dis-assembly of the body member parts 22 and 24, the removal of the "old" tubing lengths 16 and 18 from the ferrules 34 and 36 which will, in any event result in the destruction of those tubing lengths due to the strength of the gripping actions of the ferrules on the tubing lengths, the insertion of "new" tubing lengths into the ferrules as described and the cutting of those tubing length end portions to the desired lengths as described with regard to FIG. 3, and the re-assembly as described of the connector 10.

Although described by way of representative example as particularly adapted for use in bio-medical sample liquid analysis systems, it will be clear that the connector 10 of our invention is by no means limited thereto, but rather, would find useful and satisfactory application in virtually any instance wherein the simple, efficient, inexpensive and reliable connection of tubing lengths is required; commensurate of course with the positive and negative fluid pressure capabilities of the connector.

By all of the above is believed made clear that a particularly unique, ingenious and effective connector is provided by the teachings of our invention; and clearly without over-design or undue cost or complexity with regard to connector use in the biomedical sample liquid analysis system environment of particular connector adaptability.

Various changes may, of course, be made in the hereindisclosed embodiment of the connector of our invention without departing from the spirit and scope of the latter as defined in the appended claims.

What is claimed is:

1. In a zero dead volume connector for connecting separate tubing length ends of essentially the same diameter, and which includes a generally tubular body member having a bore into which said tubing lengths extend with freedom for axial movement relative thereto, the improvements comprising, retaining means in said body member bore for positively gripping said tubing lengths short of the respective tubing length ends to leave tubing length end portions projecting from said retaining means, tubing length end portion guiding and centering means operatively associated with said tubing length end portions in said body member bore and operable to guide and center said tubing length end portions for aligned abutment of said tubing length ends therewithin to connect said tubing lengths, said tubing length retaining means comprising a first ferrule operatively connected to one of said tubing lengths to positively grip the same, a second ferrule operatively connected to the other of said tubing length ends to positively grip the same, said first ferrule being spaced from said second ferrule within said body member bore, said tubing length end portion centering and guiding means being disposed between said first and second ferrules within said body member bore, at least one of said ferrules being disposed in said body member bore with freedom for axial movement with the positively gripped tubing length toward the other of said ferrules and positively gripped tubing length, and biasing means operatively associated with said body member and said one of said ferrules and operable to bias the latter, and the tubing length positively gripped thereby, toward the other of said ferrules and positively gripped tubing length whereby, said tubing length ends will be biased into aligned abutment for connection within said tubing length end portion guiding and centering means.

2. In a zero dead volume connector as in claim 1 wherein, the other of said ferrules is disposed in said body member bore with freedom for axial movement with the tubing length positively gripped thereby toward said one of said ferrules and the tubing length positively gripped by the latter.

3. In a zero dead volume connector as in claim 1 wherein, said ferrules are made of an essentially rigid material.

4. In a zero dead volume connector as in claim 1 wherein, said tubing length end portion guiding and centering means comprise a generally tubular bushing having a bore extending therethrough which is of greater diameter than the diameter of said tubing length end portions to provide clearances therebetween whereby, said tubing length end portions will be free to move axially relative to said bushing for abutment and connection therewithin.

5. In a zero dead volume connector as in claim 1 wherein, said biasing means are resilient and thereby operable to resiliently bias said tubing length ends into abutment.

6. In a zero dead volume connector as in claim 1 wherein, said tubing lengths are made of a plastic material.

7. In a zero dead volume connector as in claim 1 wherein, said ferrules are made of an essentially rigid material, said tubing lengths are formed by a flexible material, and said ferrules are generally tubular and comprise stepped bores through which said tubing lengths extend, said stepped ferrule bores including bore portions of smaller diameters than the outer diameters of said flexible tubing lengths, said stepped bore portions including edges which are operable to deform said flexible tubing lengths and reduce the diameters thereof to positively grip said flexible tubing lengths.

8. In a zero dead volume connector as in claim 1 wherein, said tubing lengths are made of a plastic material, and said ferrules are made of metal.

9. In a zero dead volume connector as in claim 1 wherein, said tubing lengths are permanently attached to said ferrules by the positive gripping action of the latter on said tubing lengths.

10. In a zero dead volume connector as in claim 2 wherein, said ferrules are generally tubular and have outer diameters which are smaller than the diameter of said body member bore to provide clearances therebetween and permit axial movement of said ferrules and the tubing lengths positively gripped thereby toward each other in said body member bore.

11. In a zero dead volume connector as in claim 4 wherein, said generally tubular bushing is of smaller outer diameter than the diameter of said body member bore to provide a clearance therebetween whereby, axial movement of said bushing in said body member bore is permitted.

12. In a zero dead volume connector as in claim 5 wherein, said resilient biasing means comprise a spring.

13. In a zero dead volume connector as in claim 5 wherein, said tubing lengths are made of a flexible plastic material with demonstrated cold flow characteristics, and wherein said tubing length ends comprise minor surface irregularities whereby, said tubing length ends will cold flow into contact at said tubing length ends abutment under the influence of said resilient biasing means to close said irregularities and form a substantially fluid-tight connection between said tubing length ends.

* * * * *